US009825560B2

(12) United States Patent
Li et al.

(10) Patent No.: US 9,825,560 B2
(45) Date of Patent: Nov. 21, 2017

(54) SYSTEM AND METHOD FOR CONTROLLING A MOTOR

(71) Applicant: Regal Beloit America, Inc., Beloit, WI (US)

(72) Inventors: Ming Li, Fort Wayne, IN (US); Peizhong Yi, Fort Wayne, IN (US); Roger Carlos Becerra, Fort Wayne, IN (US); Ludovic Andre Chretien, Columbia City, IN (US)

(73) Assignee: Regal Beloit America, Inc., Beloit, WI (US)

( * ) Notice: Subject to any disclaimer, the term of this patent is extended or adjusted under 35 U.S.C. 154(b) by 235 days.

(21) Appl. No.: 14/489,078

(22) Filed: Sep. 17, 2014

(65) Prior Publication Data

US 2016/0079888 A1 Mar. 17, 2016

(51) Int. Cl.
*H02M 7/46* (2006.01)
*H02M 3/28* (2006.01)
*H02M 7/217* (2006.01)
*H02P 6/00* (2016.01)
*H02M 1/42* (2007.01)
(Continued)

(52) U.S. Cl.
CPC ............ *H02P 6/002* (2013.01); *H01F 17/04* (2013.01); *H02M 1/126* (2013.01); *H02M 1/4225* (2013.01); *H02M 1/4266* (2013.01); *H02M 3/1584* (2013.01); *H01F 2017/0093* (2013.01); *H02M 2001/123* (2013.01);
(Continued)

(58) Field of Classification Search
CPC .............................. H02M 1/084; H02M 5/293
See application file for complete search history.

(56) References Cited

U.S. PATENT DOCUMENTS 5,602,465 A * 2/1997 Clemente ............ H02M 1/4225
323/222
6,515,460 B1 2/2003 Farrenkopf
(Continued)

FOREIGN PATENT DOCUMENTS

TW 201143262 A 12/2011

OTHER PUBLICATIONS

Musavi et al., "A High-Performance Single-Phase Bridgeless Interleaved PFC Converter for Plug-in Hybrid Electric Vehicle Battery Chargers", IEEE Transactions on Industry Applications, vol. 47, No. 4, Jul./Aug. 2011, pp. 1833-1843.
(Continued)

*Primary Examiner* — Eduardo Colon Santana
*Assistant Examiner* — Charles S Laughlin
(74) *Attorney, Agent, or Firm* — Armstrong Teasdale LLP (57) ABSTRACT

An interleaved bridgeless power factor correction (PFC) converter-based motor drive system is provided. The system includes a first inductor coupled to a second inductor. The coupled first and second inductors are coupled to a first input configured to be coupled to a first line of an alternating current (AC) power supply. The system also includes a third inductor coupled to a fourth inductor. The coupled third and fourth inductors are coupled to a second input configured to be coupled to a second line of the AC power supply. The system further includes a digital active power factor correction (PFC) controller configured to cause current in at least one of the coupled first and second inductors and the coupled third and fourth inductors to be interleaved.

20 Claims, 10 Drawing Sheets

(51) Int. Cl.
  H01F 17/04    (2006.01)
  H02M 1/12    (2006.01)
  H02M 3/158   (2006.01)
  H01F 17/00    (2006.01)

(52) U.S. Cl.
  CPC ...... H02P 2201/09 (2013.01); H02P 2201/15 (2013.01); Y02B 70/126 (2013.01)

(56) References Cited

U.S. PATENT DOCUMENTS

| | | | | |
|---|---|---|---|---|
| 6,577,109 | B2* | 6/2003 | Dancy | H02M 3/1584 |
| | | | | 323/225 |
| 7,250,742 | B2* | 7/2007 | Li | G05F 1/70 |
| | | | | 323/207 |
| 7,265,650 | B2* | 9/2007 | Jang | H01F 30/06 |
| | | | | 323/259 |
| 8,289,737 | B2 | 10/2012 | Wildash | |
| 8,482,942 | B2* | 7/2013 | Choi | H02M 1/4208 |
| | | | | 363/125 |
| 2006/0132104 | A1 | 6/2006 | Li | |
| 2006/0239046 | A1 | 10/2006 | Zane et al. | |
| 2009/0256543 | A1 | 10/2009 | Yang | |
| 2011/0037444 | A1 | 2/2011 | Wildash | |
| 2011/0149622 | A1 | 6/2011 | Lin | |
| 2012/0177133 | A1* | 7/2012 | Oldenkamp | H04B 3/54 |
| | | | | 375/257 |
| 2013/0208511 | A1* | 8/2013 | Marchand | H02M 3/22 |
| | | | | 363/15 |
| 2014/0268952 | A1* | 9/2014 | Tong | H02M 1/4241 |
| | | | | 363/89 |

OTHER PUBLICATIONS

Musavi et al., Evaluation and Efficiency Comparison of Front End AC-DC Plug-in Hybrid Charger Topologies, IEEE Transactions on Smart Grid, vol. 3, No. 1, Mar. 2012, pp. 413-421.
Lee et al., Conversion Circuit Design for High Efficiency Bridgeless Interleaved Power Factor Correction, International Journal of Energy Engineering, vol. 3, No. 2, 2013, pp. 97-109.
Biela et al., "Optimal Design of a Compact 99.3% Efficient Single-Phase PFC Rectifier", IEEE APEC, 2010, pp. 1397-1404.
Sun and Ye, "Digital Control Improves Bridgeless PFC Performance", Power Electronics Technology, Mar. 2011, pp. 20-24.
Extended European Search Report dated Feb. 10, 2016 for App. No. 15185491.6-1809, 12 pages.
Badstuebner, U et al., "Experimental Verification of the efficiency/power-density (−) Pareto Front of single-phase double-boost and TCM PFC rectifier systems", Applied Power Electronics Conference and Exposition, Mar. 17, 2013, pp. 1050-1057.
Rixin, Lai et al., "An Integrated EMI Choke for Differential-Mode and Common-Mode Noise Suppression", IEEE Transactions on Power Electronics, Institute of Electrical and Electronics Engineers, USA, vol. 25, No. 3, Mar. 1, 2010; pp. 539-544.
Musavi et al., "A high-performance single-phase AC-DC Power Factor Corrected Boost Converter for plug-in hybrid electric vehicle battery chargers", Energy Conversion Congress and Exposition (ECCE), Piscataway, NJ, Sep. 12, 2010, pp. 3588-3595.
Figueiredo et al.: "A review of single-phase PFC topologies based on the boost converter", Industry Applications (Induscon), 2010 9th IEEE/IAS International Conference; Nov. 8, 2010, pp. 1-6.

* cited by examiner

SYSTEM AND METHOD FOR CONTROLLING A MOTOR

BACKGROUND

The field of the disclosure relates generally to motor controllers, and more particularly, to systems and methods for controlling a motor.

Motor drive systems in heating, ventilation, air-conditioning (HVAC) applications usually utilize diode/rectifier-based passive AC-DC stages and large aluminum electrolytic capacitors (i.e., 1000~2000 microfarads) to maintain a substantially constant DC voltage. In general, pulsed current is generated from an AC power line, leading to a lower power factor (PF). Simultaneously, low frequency harmonic currents enter the electrolytic capacitors, causing increased temperatures and reduced life span. Moreover, a large dc-link capacitance usually leads to high inrush current during power-up. Passive inrush current limiters (i.e., negative temperature coefficient (NTC) thermistors) are typically provided in the AC power line to reduce inrush current, however, they also reduce overall system efficiency and long-term reliability. Also, in some applications, an external bulky and heavy power factor correction (PFC) choke is added to AC line to limit the inrush current and improve power factor, leading to higher cost and lower efficiency.

BRIEF DESCRIPTION

In one aspect, a motor drive system is provided. The motor drive system includes a first inductor coupled to a second inductor. The coupled first and second inductors are coupled to a first input configured to be coupled to a first line of an alternating current (AC) power supply. The motor drive system also includes a third inductor coupled to a fourth inductor. The coupled third and fourth inductors are coupled to a second input configured to be coupled to a second line of the AC power supply. The motor drive system further includes a digital active power factor correction (PFC) controller configured to cause current in at least one of the coupled first and second inductors and the coupled third and fourth inductors to be interleaved.

In another aspect, a method of controlling an interleaved bridgeless power factor correction (PFC) converter-based motor drive system is provided. The system includes a first inductor coupled to a second inductor, the coupled first and second inductors coupled to a first AC power supply line, and a third inductor coupled to a fourth inductor, the coupled third and fourth inductors coupled to a second AC power supply line. The method includes receiving, by a digital active PFC controller, a measured value of at least one operating parameter of the interleaved bridgeless PFC converter-based motor drive system. The method also includes determining, by the digital active PFC controller, a duty cycle using the measured value of the at least one operating parameter, and outputting a pulse width modulation (PWM) signal to cause current in at least one of the coupled first and second inductors and the coupled third and fourth inductors to be interleaved.

In yet another aspect, a system is provided. The system includes an electric motor and a motor drive system coupled to the electric motor. The motor drive system includes a first inductor coupled to a second inductor. The coupled first and second inductors are coupled to a first input configured to be coupled to a first line of an alternating current (AC) power supply. The motor drive system also includes a third inductor coupled to a fourth inductor. The coupled third and fourth inductors are coupled to a second input configured to be coupled to a second line of the AC power supply. The motor drive system further includes a digital active power factor correction (PFC) controller configured to cause current in at least one of the coupled first and second inductors and the coupled third and fourth inductors to be interleaved.

DETAILED DESCRIPTION

Figure 1:
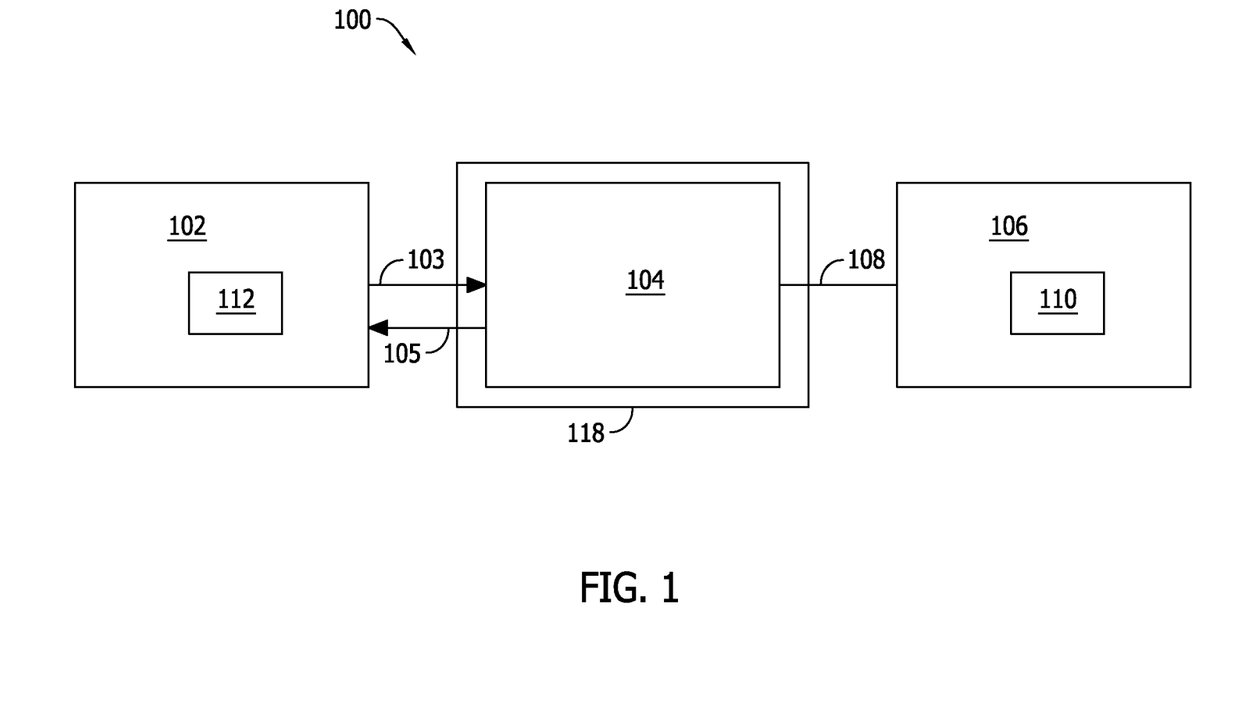
FIG. 1 is a block diagram of an example system that includes a motor controller coupled to a motor.

FIG. 1 is a block diagram of an example system 100 that includes a motor controller 102 coupled to a motor 104. Motor controller 102 transmits instructions 103 to motor 104 to control an operation of motor 104, and receives feedback 105 from motor 104 to determine the operational status of motor 104. In some implementations, motor controller 102 is incorporated within motor 104. Motor 104 may be an electric motor and, in some implementations, is an electric variable speed motor, such as an electronically commutated motor (ECM). Motor 104 drives a load 106 that includes a fluid-moving element 110, such as a fan, a blower wheel, a compressor, or an impeller. Motor 104 is coupled to fluid-moving element 110 by a shaft 108. Accordingly, system 100 may be used, for example, in a heating, ventilation, and air conditioning (HVAC) system, or, in other implementations, in an aquatic system, such as a pool or spa. Motor controller 102 includes a computing device 112 configured to enable motor controller 102 to perform one or more functions described herein.

Figure 2:
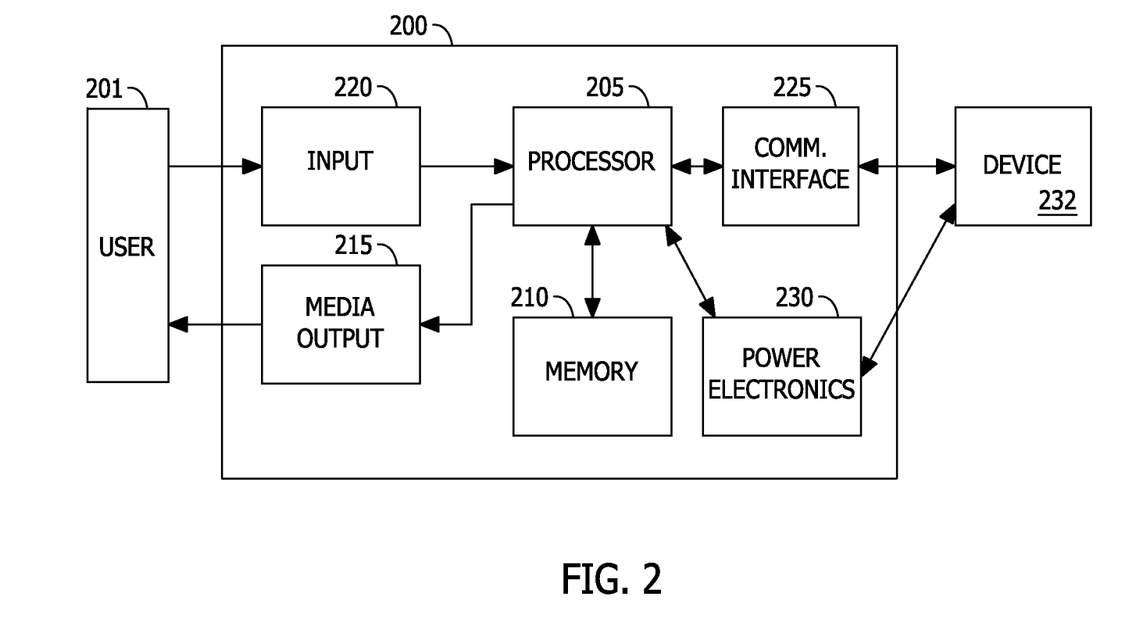
FIG. 2 is a block diagram of an exemplary computing device.

FIG. 2 is a block diagram of an exemplary computing device 200. At least some components of computing device 200 are included in implementations of other devices describe herein, for example computing device 112. Computing device 200 includes a processor 205 for executing instructions. In some implementations, executable instructions are stored in a memory area 210. Processor 205 may include one or more processing units (e.g., in a multi-core configuration). Memory area 210 is any device allowing information such as executable instructions and/or other data to be stored and retrieved. In computing device 112, memory area 210 stores parameters for starting motor 104, as described in more detail herein. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other implementations, computing device 200 does not include media output component 215. For example, some implementations of computing device 112 (FIG. 1) may not include media output component 215.

In some implementations, computing device 200 includes an input device 220 for receiving input from user 201. Input device 220 may include, for example, one or more buttons, a keypad, a touch sensitive panel (e.g., a touch pad or a touch screen), and/or a microphone. A single component such as a touch screen may function as both an output device of media output component 215 and input device 220. Some implementations of computing device 200, for example some implementations of computing device 112, do not include input device 220.

Computing device 200 may also include a communication interface 225, which is communicatively couplable to another device 232, for example motor 104. In some implementations, communication interface 225 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In implementations in which communication interface 225 couples motor controller 102 to motor 104, communication interface 225 may include, for example, one or more conductors for transmitting electrical signals and/or power to and/or from motor 104. Additionally, computing device 200 may also include power electronics 230 which may be coupled, for example, to processor 205 and motor 104.

Figure 3:
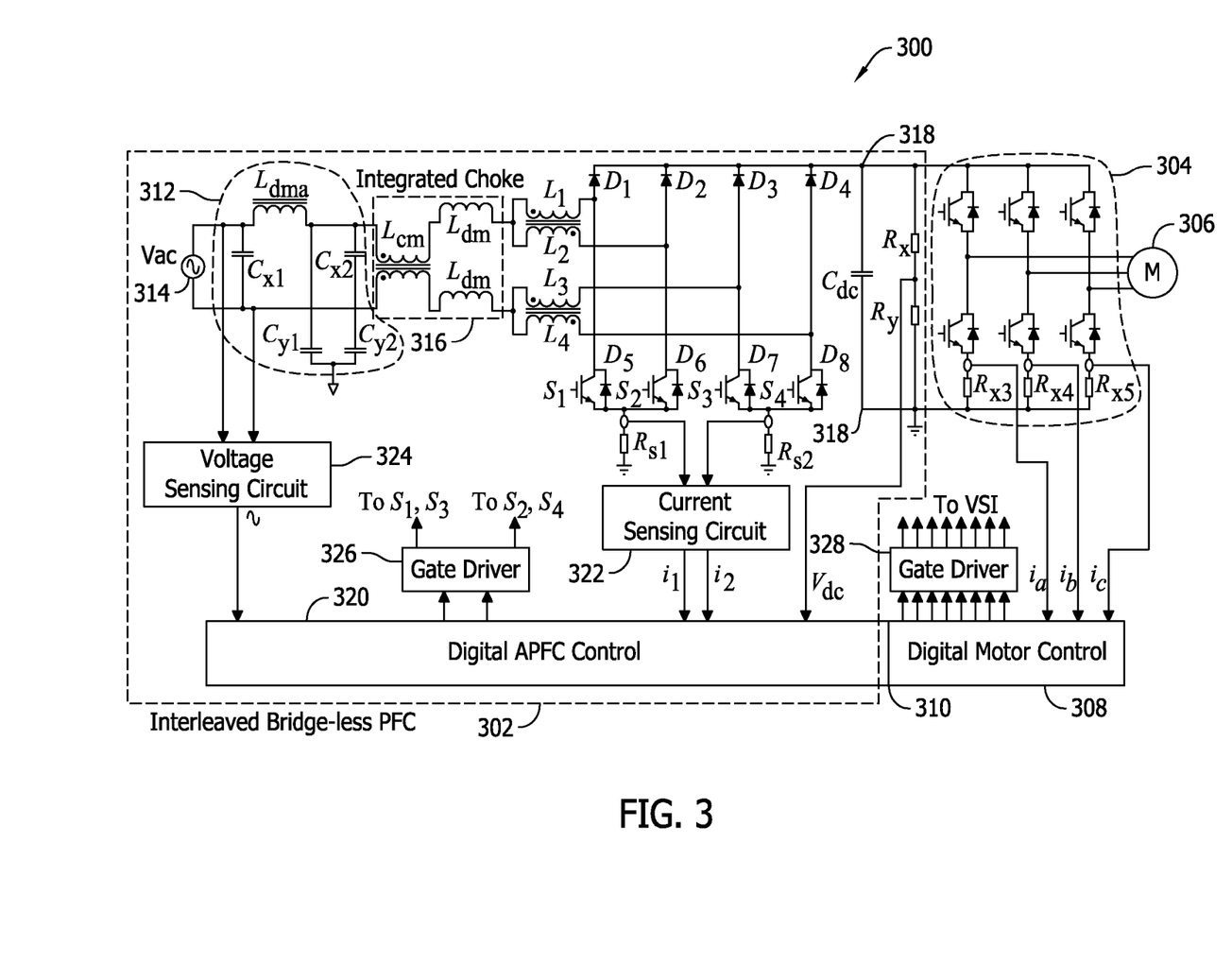
FIG. 3 is a circuit diagram of an exemplary interleaved bridgeless power factor correction (PFC) converter-based motor drive system.

FIG. 3 is a circuit diagram of an exemplary interleaved bridgeless power factor correction (PFC) converter-based motor drive system 300. In the exemplary implementation, system 300 includes an interleaved bridgeless PFC 302 coupled to a voltage source inverter (VSI) 304 that drives a motor 306. VSI 304 is communicatively coupled to a digital motor controller 308 of a motor controller 310, and digital controller 308 is configured to provide signals for driving VSI 304. VSI 304 is a traditional three-phase DC-AC voltage source inverter and is regarded as the load of interleaved bridgeless PFC 302.

Interleaved bridgeless PFC 302 includes an electromagnetic interference (EMI) filter 312 that, together with an integrated choke 316, is configured to suppress common mode electromagnetic interference. EMI filter 312 receives power from a power supply 314. Integrated choke 316 is coupled to an output of EMI filter 312. Coupled first and second inductors L1 and L2 and coupled third and fourth inductors L3 and L4 are coupled downstream from integrated choke 316. Four fast reverse recovery diodes D1~D4 are coupled in series with inductors L1~L4, respectively, and are also coupled in series with four IGBT switches S1~S4, respectively. Switches S1~S4 include four anti-paralleled diodes D5~D8, respectively. Diodes D1~D4 and switches S1~S4 are coupled to an output of coupled first and second inductors L1 and L2 and coupled third and fourth inductors L3 and L4, respectively. A dc-link capacitor Cdc is provided across a dc-link 318 for smoothing a pulsed DC voltage.

In the exemplary embodiment, interleaved bridgeless PFC 302 also includes a digital active power factor correction (APFC) controller 320 included in motor controller 310. APFC controller 320 is configured to cause current in at least one of coupled first and second inductors L1 and L2 and coupled third and fourth inductors L3 and L4 to be interleaved. More specifically, APFC controller 320 receives converter current sensing measurements across first and second shunt resistors Rs1 and Rs2 from a current sensing circuit 322. A voltage divider formed by resistors Rx and Ry is used for sensing dc-link voltage Vdc. Input voltage Vac is sensed by a voltage sensing circuit 324. DC link voltage Vdc and input voltage Vac are provided to APFC controller 320. A combination of two stages is able to achieve a motor drive function powered by single-phase AC power line, with high power factor, high efficiency, low inrush current, low electrolytic capacitance and high density integration of magnetic components.

Interleaved bridgeless PFC 302 operates as a dual-boost circuit. In a positive half line cycle, diode D1, diode D2, switch S1, and switch S2 are main switching devices. Anti-paralleled diodes D7 and D8 equally share the total return current, i.e., in a paralleled connection. There are two boost converters in the positive line cycle. Specifically, a first boost converter includes top coupled inductor L1, diode D1, and switch S1, whereas a second boost converter includes top coupled inductor L2, diode D2, and switch S2. The gate driver signals of S1 and S2 have a 180 degree phase shift.

In a negative half line cycle, diode D3, diode D4, switch S3, and switch S4 are main switching devices. Anti-paralleled diodes D5 and D6 equally share the total return current, i.e., in a paralleled connection. There are two boost converters in the negative line cycle. Specifically, a third boost converter includes bottom inductor L3, diode D3, and switch S3, whereas a fourth boost converter includes bottom coupled inductor L4, diode D4, and switch S4. The gate driver signals of S3 and S4 have a 180 degree phase shift.

In the exemplary embodiment, integrated choke 316 includes a high common-mode (CM) inductor Lcm and a high differential-mode (DM) inductor Ldm. Integrated choke 316 uses a toroid core with two windings for high CM inductance (i.e., 10 mH~20 mH). Ferrite blocks inside the toroid core provide a DM flux path and increase DM inductance (i.e., 200 uH~300 uH). Integrated choke 316 has two functions: (1) act as an EMI filter; and (2) act as a partial boost inductor. The partial boost inductor improves the magnetic utilization to achieve a high-density design.

Coupled first and second inductors L1 and L2 and coupled third and fourth inductors L3 and L4 are the other parts of the boost inductor. A subtractive connection is used to couple inductors L1 and L2, and inductors L3 and L4 with other part of the circuit. Specifically, coupled first and second inductors L1 and L2 include a toroid core with two windings that increase effective boost inductance when the boost converter operates in a continuous conduction mode and reduce a size of the magnetic components. For instance, when the boost converter operates, the equivalent inductors are Leqi (i=1, 2, 3, 4), which have larger inductance compared to stand-alone inductors (i.e., measured inductance of one winding with the other winding open). Coupled third and fourth inductors L3 and L4 are substantially similar to coupled first and second inductors L1 and L2.

Figure 4:
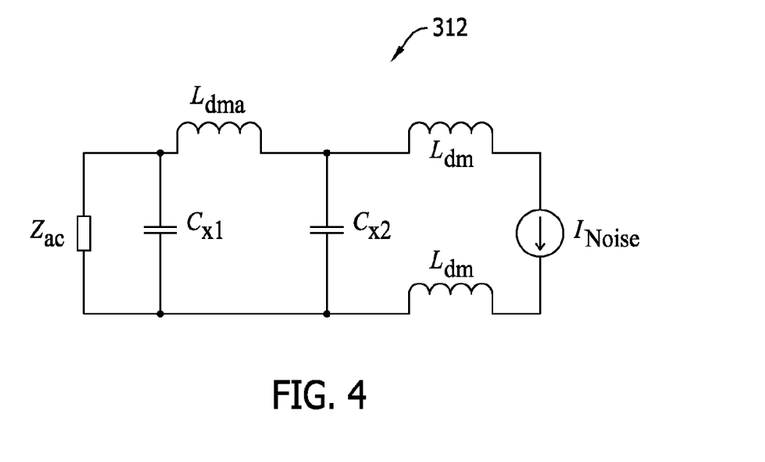
FIG. 4 is an equivalent circuit topology of a front-end DM EMI filter.

FIG. 4 is an equivalent circuit topology of a front-end DM EMI filter 312. Integrated choke 316 is configured to suppress CM EMI, which is generated by switching operations of IGBTs in active power factor control (APFC) and VSI stages. A CM EMI filter 312 in the front-end section is formed by an L-C type low pass filter, and includes a CM inductance Lcm and two Y-capacitors Cy1 and Cy2. Simultaneously, leakage inductance Ldm reduces the overall ripple current demanded by the load system, which is the source of DM EMI. As a result, interleaved bridgeless PFC 302 is equivalently using high-order DM EMI filter topology to suppress DM EMI, including two X-capacitors Cx1 and Cx2, inductor Ldma, and leakage inductance Ldm. Inoise is the DM EMI source which is determined by the load. Zac is the grid impedance which takes the load EMI noise current. Accordingly, integrated choke 316 can reduce both CM and DM conducted EMI in interleaved bridgeless PFC 302.

Furthermore, the interleaved fashion is used for the gate signals of two main switches in each half line cycle, in order to effectively increase the switching frequency and to reduce the current ripple of boost inductors. The interleaved fashion also reduces the stress and requirements of component ratings, such as magnetic components, semiconductor devices, and electrolytic capacitor.

Figure 5:
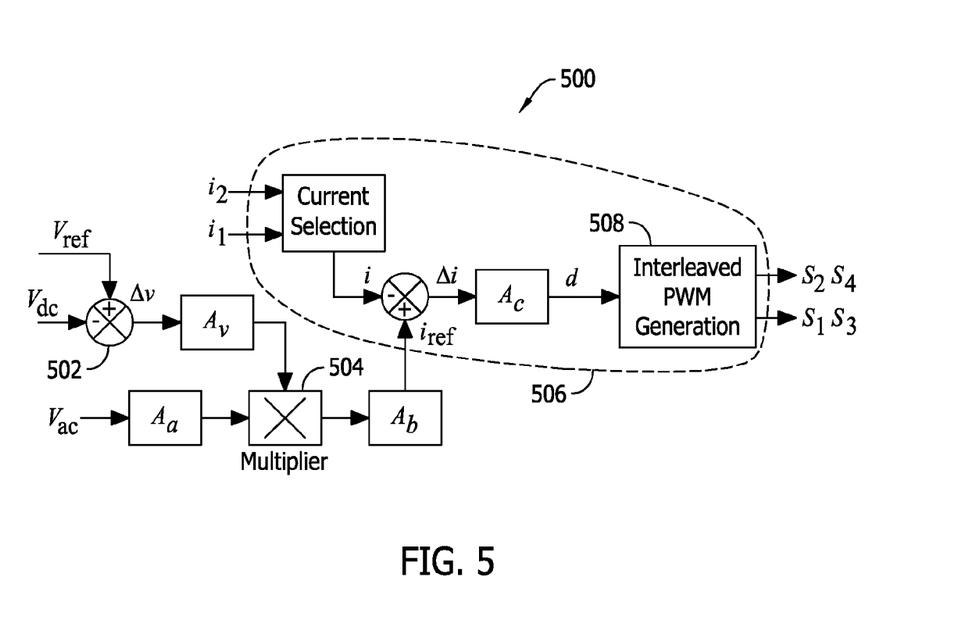
FIG. 5 is a block diagram of an exemplary digital average current mode control module for controlling the bridgeless interleaved PFC shown in FIG. 3.

FIG. 5 is a block diagram of an exemplary digital average current mode control module 500 for controlling bridgeless interleaved PFC 302 (shown in FIG. 3). In the exemplary implementation, digital average current mode control module 500 is stored within APFC controller 320. First shunt resistor Rs1 and second shunt resistor Rs2 are used to sense total return currents in the negative and positive half line cycles, respectively. Input voltage Vac and dc-link voltage Vdc signals are sensed via analog circuits and provided to APFC controller 320. Each sensed signal is processed by at least one analog amplifier circuit to meet the voltage range requirements of digital signal processor (DSP) chips. The DSP chip fulfills loop compensation and PWM signal generation, and then outputs the PWM signals to external gate driver circuits. Specifically, the digital implementation of APFC stages and motor control stages can be fulfilled by a single DSP chip, or two or more separate DSP chips. Output signals of digital APFC control module 320 are PWM signals for a gate driver circuit 326. Specifically, for the APFC stage, IGBTs S1 and S3 share a first gate signal, whereas IGBT S2 and S4 share a second gate signal. In addition, the outputs of digital motor controller 308 include six PWM signals for a gate driver circuit 328 of six IGBTs in the VSI stage.

In the exemplary implementation, digital average current mode control module 500 subtracts the measured dc-link voltage Vdc from a voltage reference Vref at a summing junction 502. A resulting error signal Δv is then processed by a compensator Av, for example, a low-pass filter or a proportional integral (PI) controller. Sensed input voltage signal Vac is processed by a low-pass filter Aa, and then it becomes the absolute value of sinusoidal signal by DSP calculation. The corresponding outputs of Av and Aa are multiplied at a multiplier 504. A low-pass filter Ab receives the output of multiplier 504 to reduce zero-crossing distortion of inductor current in APFC circuit. The output of Ab is regarded as a reference signal iref for an inner current loop 506. APFC controller 320 selects the total return current signal from i1 and i2 according to a negative or a positive half line cycle of input voltage. An error signal Δi between reference signal iref and selected current information i is processed by a compensator Ac, such as a low-pass filter or a proportional integral (PI) controller. Compensator Ac outputs a duty cycle d that is processed by an interleaved PWM generation module 508. Interleaved PWM generation module 508 outputs two PWM signals for main switches S1~S4. S1 and S3 use a first gate signal, while S2 and S4 use a second gate signal.

Figure 6:
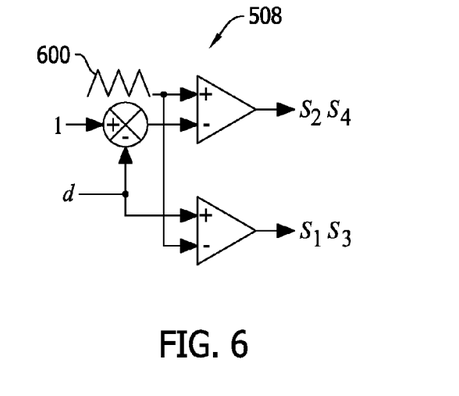
FIG. 6 is a block diagram showing operation of the interleaved PWM generation module shown in FIG. 5.

FIG. 6 is a block diagram showing operation of interleaved PWM generation module 508. In the exemplary implementation, interleaved PWM generation module 508 uses a single timer (not shown) to improve efficiency of the DSP chip and to save system cost. Specifically, the timer induces a triangle signal 600 that ranges from 0 to 1. Duty cycle d is compared to triangle signal 600 to generate a first PWM signal for S1 and S3. Duty cycle d is subtracted from 1 and then compared to triangle signal 600 to generate a second PWM signal for S2 and S4. As a result, first and second PWM output signals have the same duty cycle value with a 180 degree phase shift in each switch cycle.

Figure 7:
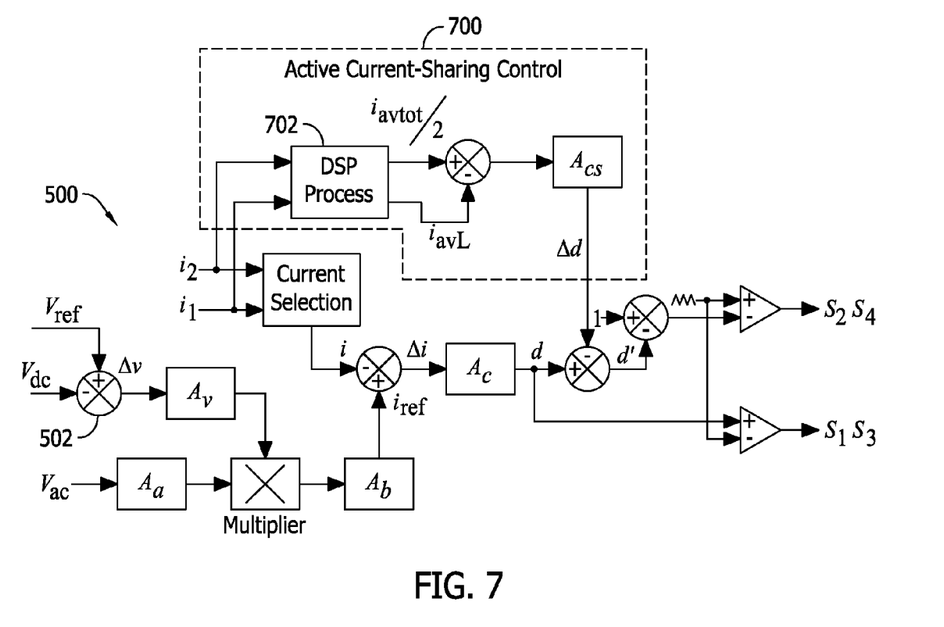
FIG. 7 is a block diagram of the digital average current model control module shown in FIG. 5 with an active current-sharing control module.

FIG. 7 is a block diagram of digital average current mode control module 500 (shown in FIG. 5) with an active current-sharing control module 700. Active current-sharing control in interleaved bridgeless PFC 302 is added when the extent of parameters' mismatch, such as inductor ESR and on-state resistance of semiconductor devices among two boost converters (in each half line cycle), is severe. Unbalanced currents in two converters degrade long-term reliability of system because current stress of the two converters is not even, especially in high power applications. Active current sharing control module 700 uses current information of two shunts simultaneously. DSP calculation chip 702 selects current information of one shunt when the IGBT is ON to get the average current of the corresponding inductor current iavL in one boost converter. DSP calculation chip 702 also calculates half of total return current in the other shunt iavtot/2. An error signal between iavL and iavtot/2 is processed by a compensator Acs, such as a PI compensator. An output Δd of compensator Acs is added to PWM signal generation path of the regular current loop to adjust a finalized duty cycle d' of one converter in a timely fashion. Only converter 2 (i.e., S2) or 4 (i.e., S4) are necessarily controlled because in every half line cycle there are only two switching converters, and even current-sharing performance can be achieved when one of them matches the half of total system current.

Figure 8:
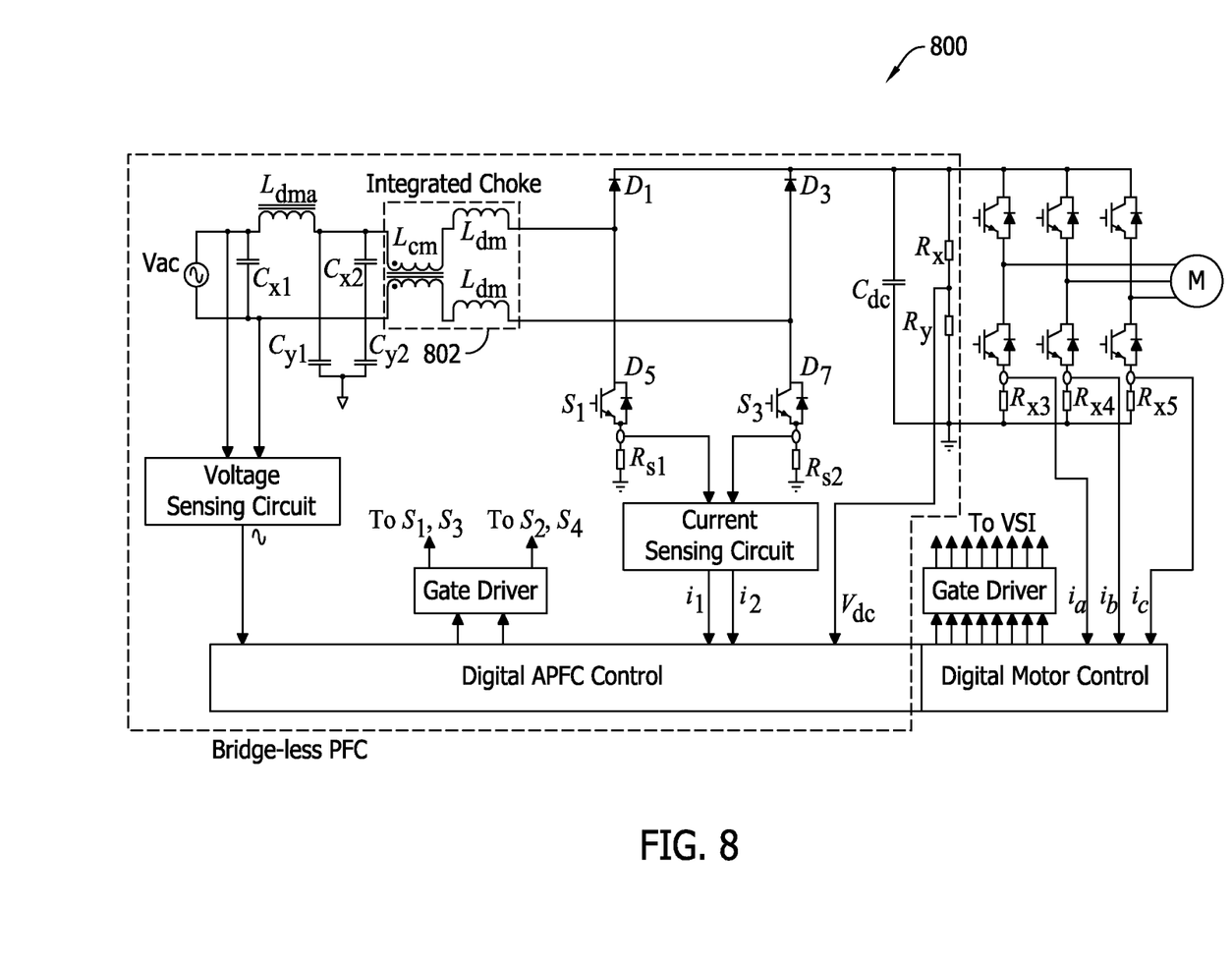
FIG. 8 is a circuit diagram of an exemplary non-interleaved bridgeless power factor correction (PFC) converter-based motor drive system.

FIG. 8 is a circuit diagram of an exemplary non-interleaved bridgeless power factor correction (PFC) converter-based motor drive system 800. Bridgeless interleaved PFC 302 (shown in FIG. 3) may become a non-interleaved bridgeless PFC circuit via digital control in terms of power level and input voltage level. This is accomplished by disabling two main switches (i.e., $S_2$ and $S_4$). In FIG. 8, an integrated EMI choke 802 is only necessary as the boost inductor for APFC operation. The average current mode control strategy of the non-interleaved bridgeless PFC circuit is the same as the interleaved bridgeless PFC circuit, with the exception of disabling one-channel PWM signal for IGBTs. The bridgeless PFC circuit using only the integrated EMI choke can achieve higher power density and lower cost in low power applications.

Figure 9:
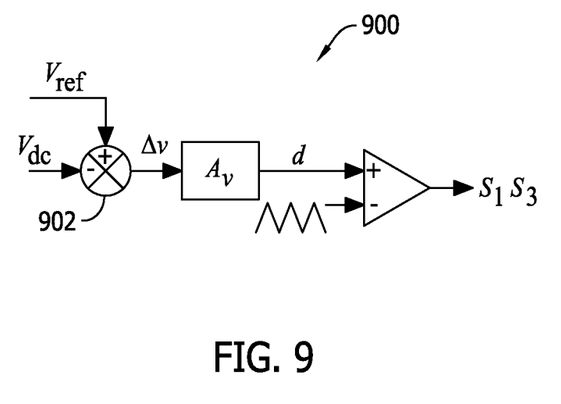
FIG. 9 is a block diagram showing single-loop control for the bridgeless PFC shown in FIG. 3 using a single-loop voltage mode control module.

FIG. 9 is a block diagram showing single-loop control for bridgeless PFC 302 using a single-loop voltage mode control module 900. For bridgeless PFC operation with an integrated EMI choke, single-loop voltage mode control can be used in low cost and low power motor drive applications (e.g., below 300 W). As shown in FIG. 9, for single-loop voltage mode control, the input voltage sensing and current sensing information are no longer necessary, and only the dc-link voltage $V_{dc}$ information is used. Single-loop voltage mode control module 900 subtracts the measured dc-link voltage $V_{dc}$ from a voltage reference $V_{ref}$ at a summing junction 902 to generate an error signal Δv. Error signal Δv is processed by a compensator $A_v$, such as a low-pass filter or a proportional integral (PI) controller to generate a duty cycle d. Duty cycle d is compared to the triangle signal to generate a PWM signal for $S_1$ and $S_3$. Because the inductor current operates in discontinuous conduction mode, a high power factor is naturally achieved because the peak value of inductor current in each switching cycle follows the sinusoidal shape of input voltage.

Figure 10:
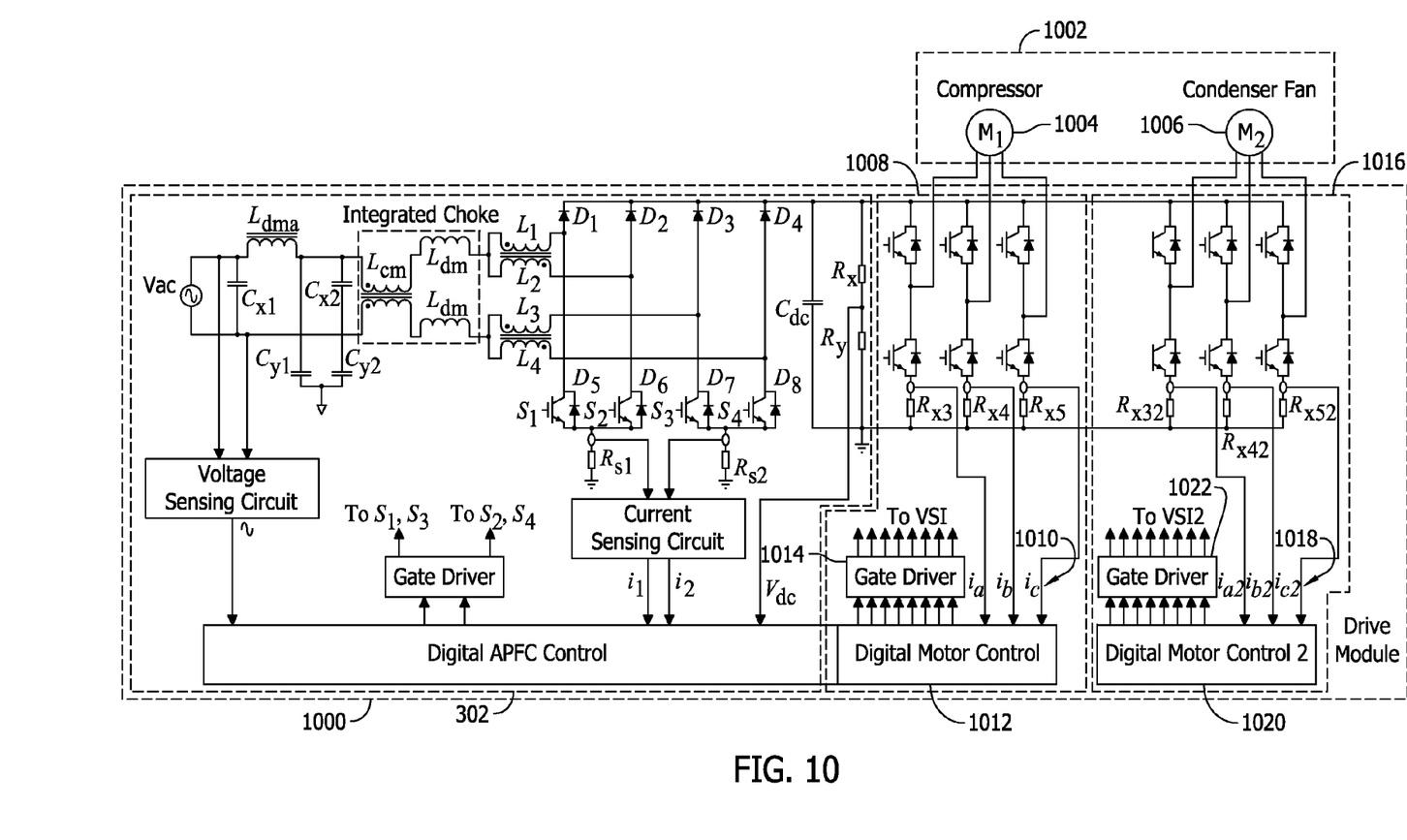
FIG. 10 is a circuit diagram of a bridgeless interleaved PFC drive module integrated with two motor drive systems in a heating, ventilation, and air conditioning (HVAC) outdoor unit.

FIG. 10 is a circuit diagram of a bridgeless interleaved PFC drive module 1000 integrated with two motor drive systems in a heating, ventilation, and air conditioning (HVAC) outdoor unit 1002. HVAC outdoor unit 1002 includes a compressor motor 1004 and a condenser fan motor 1006. PFC drive module 1000 may be implemented as a module or as discrete components. In the exemplary embodiment, bridgeless interleaved PFC drive module 1000 is coupled to a first motor drive 1008 configured to drive compressor motor 1004, which has higher power than condenser fan motor 1006, ranging from about 4 HP to about 7 HP. First motor drive system 1008 includes current sensing 1010, a digital motor control processing micro controller 1012, and a gate driver circuit 1014.

Bridgeless interleaved PFC drive module 1000 is also coupled to a second motor drive 1016 configured to drive condenser fan motor 1006, which ranges from about 1/10 HP to about 1/3 HP. First and second motor drives 1008 and 1016 share the same front-end AC-DC power stage, which is similar to interleaved bridgeless PFC 302 (shown in FIG. 3). Second motor drive 1016 includes current sensing 1018, a digital motor control processing micro controller 1020, and a gate driver circuit 1022.

Figure 11:
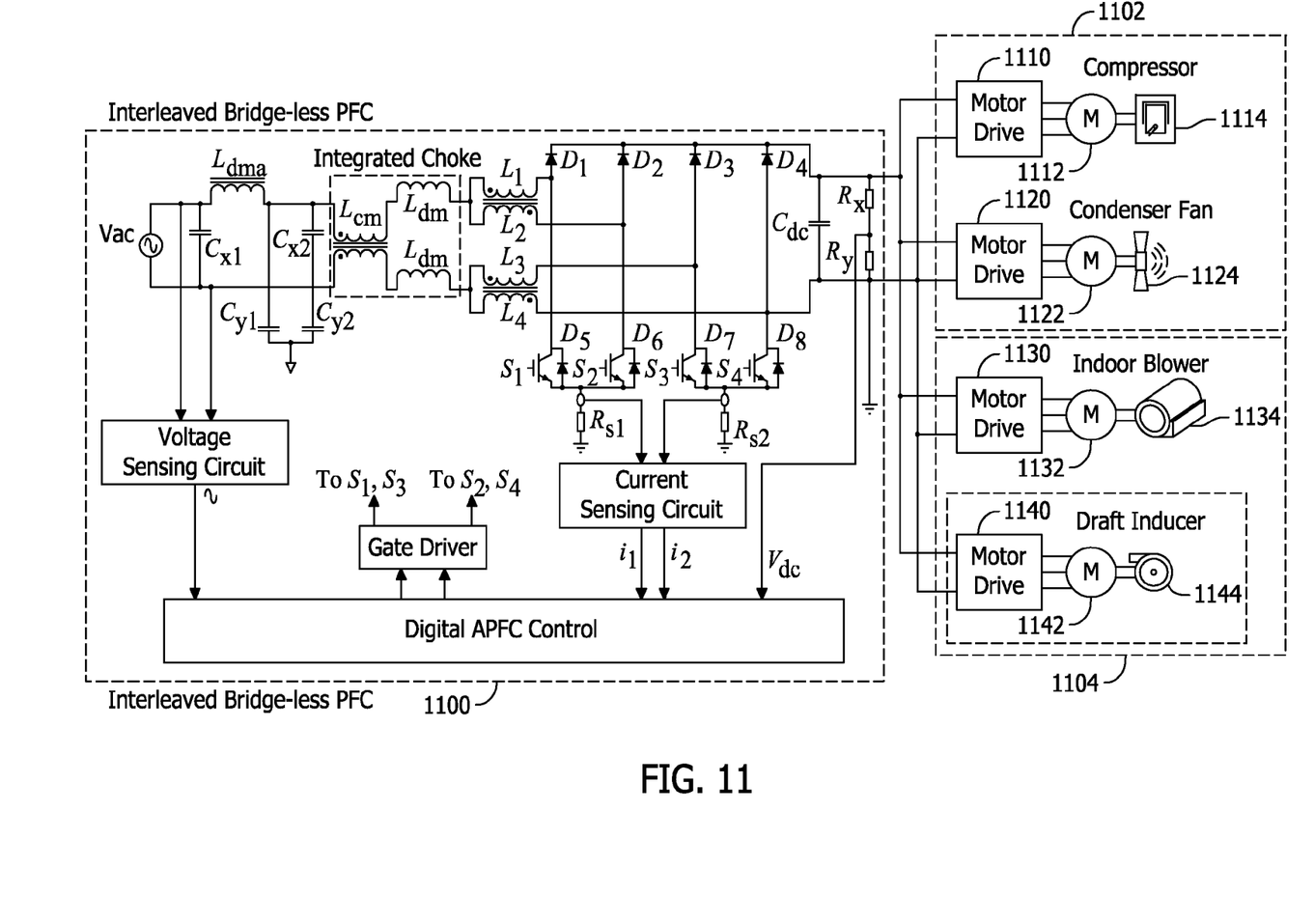
FIG. 11 is a circuit diagram of a bridgeless interleaved PFC loaded with four motor drive systems in an HVAC outdoor unit and an HVAC indoor unit.

FIG. 11 is a circuit diagram of a bridgeless interleaved PFC 1100 loaded with four motor drive systems 1110, 1120, 1130, 1140 in an HVAC outdoor unit 1102 and an HVAC indoor unit 1104. In the exemplary embodiment, bridgeless interleaved PFC 1100 is similar to bridgeless interleaved PFC 302 (shown in FIG. 3). Motor drive 1110 is coupled to a compressor motor 1112 for driving a compressor 1114, motor drive 1120 is coupled to a condenser fan motor 1122 for driving a condenser fan 1124, motor drive 1130 is coupled to a indoor blower motor 1132 for driving a blower 1134, and motor drive 1140 is coupled to a draft inducer motor 1142 for driving a draft inducer 1144.

In the exemplary embodiment, bridgeless interleaved PFC 1100 provides a DC source to each motor 1112, 1122, 1132, 1142. First motor drive 1110 is similar to first motor drive 1008 (shown in FIG. 10) for driving compressor motor 1004 (shown in FIG. 10), and second motor drive 1120 is similar to second motor drive 1016 (shown in FIG. 10) for driving condenser fan motor 1006 (shown in FIG. 10). Third motor drive 1130 is configured to drive indoor blower motor 1132, which ranges from about ½ HP to about 1 HP, and fourth motor drive 1140 is configured to drive low power draft inducer motor (about 50 W) 1142, which is optional in HVAC indoor unit 1104. Motor drives 1110, 1120, 1130, 1140 share the same front-end AC-DC power stage, which is bridgeless interleaved PFC 1100. Each motor drive 1110, 1120, 1130, 1140 has its own respective current sensing, digital motor control processing microcontroller, and gate driver circuit.

Figure 12:
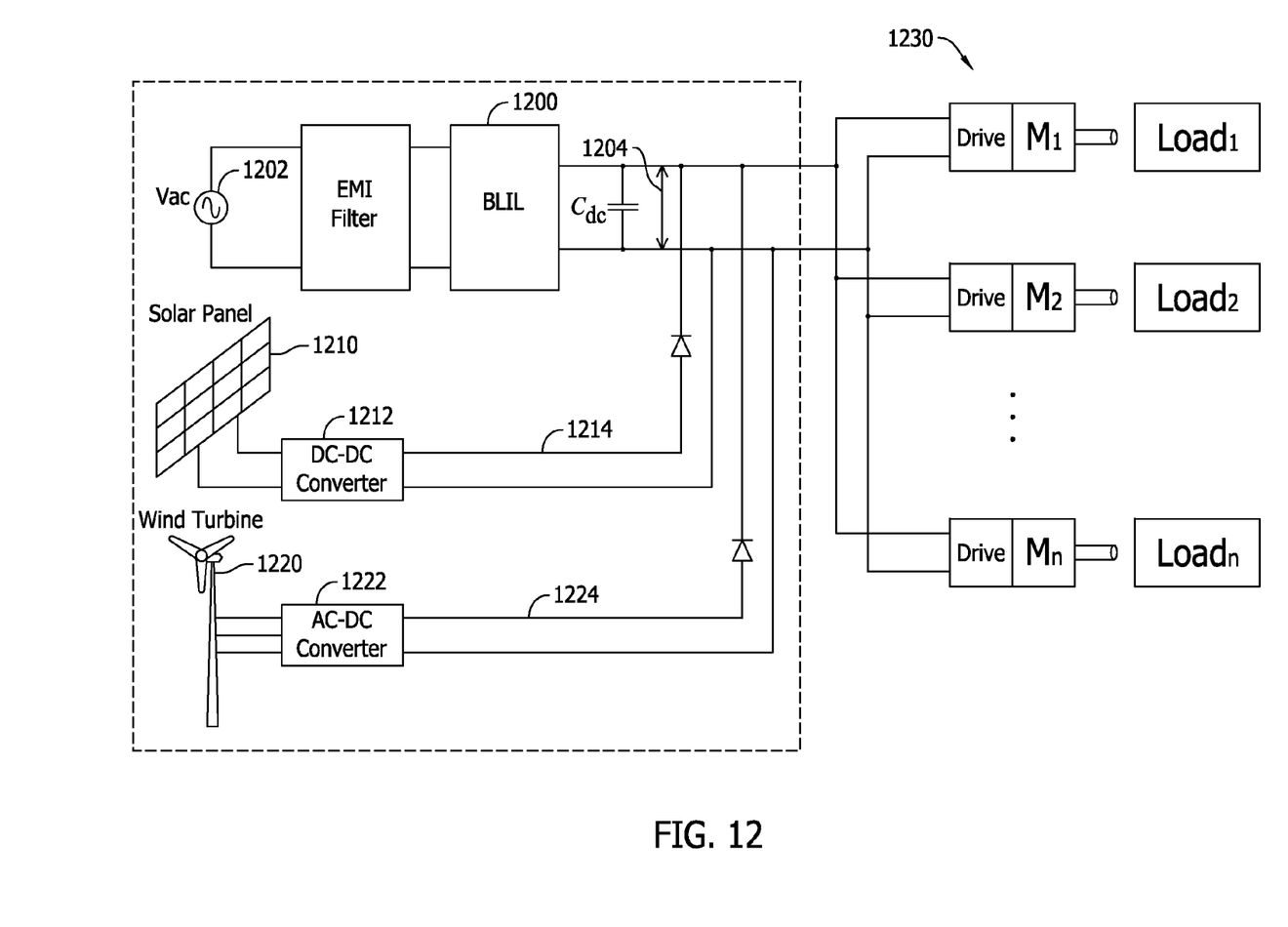
FIG. 12 is a circuit diagram of a bridgeless interleaved PFC incorporated with a solar panel and a wind turbine.

FIG. 12 is a circuit diagram of a bridgeless interleaved PFC 1200 incorporated with a solar panel 1210 and a wind turbine 1220. In the exemplary embodiment, bridgeless interleaved PFC 1200 provides a stable DC power source for a multiple motor system 1230. Bridgeless interleaved PFC 1200 boosts AC power from an AC power source 1202 to DC voltage at a DC link 1204. Solar panel 1210 uses a DC-DC converter 1212 to boost input DC power to a higher DC voltage 1214, which is provided to DC link 1204. The DC voltage 1214 output by DC-DC converter 1212 is the same as the DC voltage provided by bridgeless interleaved PFC 1200 at DC link 1204. Wind turbine 1220 uses an AC-DC converter 1222 to convert 3-phase AC power to a DC voltage 1224, which is provided to DC link 1204. Multiple motors M1-Mn may then share the same DC link voltage provided by bridgeless interleaved PFC 1200, solar panel 1210, and wind turbine 1220. Each motor M1-Mn may be either 3-phase motor or single phase motor and includes a motor drive such as motor drives 1008 or 1016 (shown in FIG. 10).

The embodiments described herein provide an interleaved bridgeless (PFC) converter-based motor drive system having an improved power factor, reduced inrush current, reduced electrolytic capacitance, increased density of magnetic components, and improved operating modes. Low frequency harmonics (i.e., 60 Hz, 180 Hz and 240 Hz) do not exist in the system, so the power factor is much higher than traditional diode/rectifier-based passive front-end AC-DC stages. The effective RMS current through the dc-link capacitor is reduced so the dc-link capacitance and size may also be reduced. As a result, inrush current is reduced accordingly.

The methods and systems described herein may be implemented using computer programming or engineering techniques including computer software, firmware, hardware or any combination or subset thereof, wherein the technical effect may include at least one of: (a) receiving, by a digital active PFC controller, a measured value of at least one operating parameter of the interleaved bridgeless PFC converter-based motor drive system; (b) determining, by the digital active PFC controller, a duty cycle using the measured value of the at least one operating parameter; and (c) outputting, by the digital active PFC controller, a pulse width modulation (PWM) signal to cause current in at least one of the coupled first and second inductors and the coupled third and fourth inductors to be interleaved.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

Exemplary embodiments of systems and methods for controlling a motor are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor drive system comprising: a first inductor coupled to a second inductor by a first common toroid core having two windings to boost inductance, said coupled first and second inductors comprising a first side commonly coupled to a first input configured to be coupled to a positive line input of an alternating current (AC) power supply;

a third inductor coupled to a fourth inductor by a second common toroid core having two windings to boost inductance, said coupled third and fourth inductors comprising a first side commonly coupled to a second input configured to be coupled to a negative line input of the AC power supply;

a digital active power factor correction (PFC) controller coupled to at least one switch having a first terminal coupled to an output of one of said first, second, third, and fourth inductors and a second terminal coupled to one of a first and a second shunt resistor, said digital active PFC controller is configured to:

receive a measured value of the at least one operating parameter of said interleaved bridgeless PFC converter-based motor drive system;

determine a duty cycle using the measured value of the at least one operating parameter:

output a pulse width modulation (PWM) signal for controlling said at least one switch in accordance with the determined duty cycle; and configured to cause current in at least one of said coupled first and second inductors and said coupled third and fourth inductors to be interleaved.

2. The motor drive system of claim 1, further comprising an integrated choke coupled between said first input and said coupled first and second inductors, and said second input and said coupled third and fourth inductors.

3. The motor drive system of claim 2, wherein said integrated choke comprises a toroid core, a first winding, and a second winding, said integrated choke is configured to increase common mode inductance for suppressing common mode electromagnetic interference (EMI).

4. The motor drive system of claim 3, wherein said integrated choke has a common mode inductance between about 10 mH and about 20 mH.

5. The motor drive system of claim 1, wherein said integrated choke comprises a toroid core and a plurality of ferrite blocks within said toroid core, said integrated choke is configured to increase differential mode inductance for suppressing differential mode EMI.

6. The motor drive system of claim 5, wherein said integrated choke has a differential mode inductance between about 200 µH and about 300 µH.

7. The motor drive system of claim 1, further comprising a first shunt resistor and a second shunt resistor, each of said first and second shunt resistors having a first terminal coupled to two semiconductor switches and a second terminal coupled to a negative rail of a DC-link capacitor.

8. The motor drive system of claim 1, wherein the at least one operating parameter includes at least one of an input voltage, a DC link voltage, and a total return current from said at least one switch.

9. The motor drive system of claim 1, wherein said digital active PFC controller is further configured to:

subtract a measured DC link voltage from a reference voltage to determine a voltage error signal;

multiply the voltage error signal and a measured input voltage; and filter the multiplied voltage error signal and measured input voltage to determine a current reference signal and to reduce zero-crossing distortion of inductor current from said first, second, third, and fourth inductors.

10. The motor drive system of claim 9, wherein said digital active PFC controller is further configured to:

receive a measured total return current from a current sensing circuit;

calculate a difference between the current reference signal and the measured total return current;

filter the calculated difference to obtain the duty cycle; and output the pulse width modulation (PWM) signal for controlling said at least one switch in accordance with the determined duty cycle.

11. The motor drive system of claim 10, wherein said digital active PFC controller is further configured to:
compare the duty cycle to a triangle signal induced by a timer that ranges from 0 to 1 to obtain a first PWM signal; and
subtract the duty cycle from a unity value of 1 and compare the subtracted duty cycle value to the triangle signal to obtain a second PWM signal.

12. The motor drive system of claim 1, wherein said digital active PFC controller is further configured to provide active current-sharing control to balance current between said coupled first and second inductors and said coupled third and fourth inductors.

13. The motor drive system of claim 12, wherein to provide active current-sharing control, said digital active PFC controller is further configured to:
calculate current information of said first shunt when said at least one switch is ON to determine an average current of the corresponding inductor current in a first boost converter;
calculate half of the total return current in said second shunt;
process an error signal between the average current of the corresponding inductor current and the calculated half of the total return current; and
add the processed error signal to the PWM signal to adjust e duty cycle.

14. A method of controlling an interleaved bridgeless power factor correction (PFC) converter-based motor drive system, said method comprising:
coupling a first inductor to a second inductor using a first common toroid core having two windings to boost inductance, the coupled first and second inductors having a first side commonly coupled to a first input configured to be coupled to a positive line input of an alternating current (AC) power supply;
coupling a third inductor to a fourth inductor using a second common toroid core having two windings to boost inductance, the coupled third and fourth inductors comprising a first side commonly coupled to a second input configured to be coupled to a negative line input of the AC power supply;
receiving, by a digital active PFC controller, a measured value of at least one operating parameter of the interleaved bridgeless PFC converter-based motor drive system;
determining, by the digital active PFC controller, a duty cycle using the measured value of the at least one operating parameter; and
outputting, by the digital active PFC controller, a pulse width modulation (PWM) signal to cause current in at least one of the coupled first and second inductors on the positive line input and the coupled third and fourth inductors on the negative line input to be interleaved.

15. The method of claim 14, further comprising:
subtracting a measured DC link voltage from a reference voltage to determine a voltage error signal;
multiplying the voltage error al and a measured input voltage; and
filtering the multiplied voltage error signal and measured input voltage to determine a current reference signal and to reduce zero-crossing distortion of inductor current from the first, second, third, and fourth inductors.

16. The method of claim 15, further comprising:
receiving a measured total return current from a current sensing circuit;
calculating a difference between the current reference signal and the measured total return current;
filtering the calculated difference to obtain the duty cycle; and
outputting the PWM signal for controlling at least one switch in accordance with the determined duty cycle.

17. The method of claim 16, further comprising:
comparing the duty cycle to a triangle signal induced by a timer that ranges from 0 to 1 to obtain a first PWM signal; and
subtracting the duty cycle from a unity value of 1 and compare the subtracted duty cycle value to the triangle signal to obtain a second PWM signal.

18. The method of claim 14, further comprising providing active current-sharing control to balance current between said coupled first and second inductors and said coupled third and fourth inductors.

19. The method of claim 14, further comprising:
providing PWM disabling signals to change the interleaved bridgeless PFC converter-based motor drive system circuit topology to a non-interleaved bridgeless PFC converter based motor drive system; and
deactivating the coupled first and second inductors, and the coupled third and four inductors.

20. A system comprising: an electric motor; and a motor drive system coupled to said electric motor, said motor drive system comprising:
a first inductor coupled to a second inductor by a first common toroid core having two windings to boost inductance, said coupled first and second inductors comprising a first side commonly coupled to a first input configured to be coupled to a positive line input of an alternating current (AC) power;
a third inductor coupled to a fourth inductor by a second common inductors comprising a first side commonly coupled to a second input configured to be coupled to a negative line input of the AC power supply;
a digital active power factor correction (PFC) controller coupled to at least one switch having a first terminal coupled to an output of one of said first, second, third, and fourth inductors and a second terminal coupled to one of a first and a second shunt resistor, said digital active PFC controller is configured to:
receive a measured value of the at least one operating parameter of said interleaved bridgeless PFC converter-based motor drive system;
determine a duty cycle using the measured value of the at least one operating parameter;
output a pulse width modulation (PWM) signal for controlling said at least one switch in accordance with the determined duty cycle; and
configured to cause current in at least one of said coupled first and second inductors and said coupled third and fourth inductors to be interleaved.

* * * * *